United States Patent
Sato

(10) Patent No.: US 6,819,944 B1
(45) Date of Patent: Nov. 16, 2004

(54) MOBILE TERMINAL EQUIPPED WITH ADAPTER FOR IMAGE DISPLAY AND METHOD FOR HANDLING CHANGES IN CONNECTION LINE QUALITY

(75) Inventor: Ryohei Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/548,996

(22) Filed: Apr. 14, 2000

(30) Foreign Application Priority Data

May 17, 1999  (JP) .......................................... 99-136040

(51) Int. Cl.[7] .................................................. H04B 1/38
(52) U.S. Cl. ................. 455/566; 455/67.11; 455/226.1; 455/423; 455/425; 345/3.4; 345/699; 345/864
(58) Field of Search ............................. 455/67.1, 67.7, 455/226.1, 423, 424, 425, 566; 345/3.4, 699, 864

(56) References Cited

U.S. PATENT DOCUMENTS

| | | | | |
|---|---|---|---|---|
| 5,390,365 A | * | 2/1995 | Enoki et al. ............. | 455/553.1 |
| 5,493,515 A | * | 2/1996 | Batchelder et al. ........... | 702/67 |
| 5,724,062 A | * | 3/1998 | Hunter ....................... | 345/102 |
| 5,802,039 A | * | 9/1998 | Obayashi et al. ........... | 370/216 |
| 5,823,651 A | * | 10/1998 | Helot et al. .................. | 353/120 |
| 5,874,928 A | * | 2/1999 | Kou ........................... | 345/1.1 |
| 5,920,351 A | * | 7/1999 | Takeshima et al. ......... | 348/379 |
| 5,950,139 A | * | 9/1999 | Korycan ..................... | 455/566 |
| 6,025,899 A | * | 2/2000 | Fukunaga et al. .......... | 349/115 |
| 6,027,222 A | * | 2/2000 | Oki et al. ..................... | 362/31 |
| 6,035,183 A | * | 3/2000 | Todd et al. .............. | 455/226.2 |
| 6,052,565 A | * | 4/2000 | Ishikura et al. ............ | 455/67.1 |
| 6,091,716 A | * | 7/2000 | Gorday et al. .............. | 370/314 |
| 6,094,185 A | * | 7/2000 | Shirriff ........................ | 345/102 |
| 6,340,994 B1 | * | 1/2002 | Margulis et al. ............ | 348/625 |
| 6,362,835 B1 | * | 3/2002 | Urbanus et al. ............ | 345/692 |

FOREIGN PATENT DOCUMENTS

| | | | |
|---|---|---|---|
| DE | 19739897 A | 4/1999 | |
| JP | 3-284030 | 12/1991 | |
| JP | 4-373390 | 12/1992 | |
| JP | 5-204304 | 8/1993 | |
| JP | 6-233045 | 8/1994 | |
| JP | 6-276149 | 9/1994 | |
| JP | 8-8802 | 1/1996 | |
| JP | 9-116596 | * 5/1997 | ........... H04L/29/08 |
| JP | 9-312813 | 12/1997 | |
| JP | 11-75048 | 3/1999 | |

* cited by examiner

Primary Examiner—William Trost
Assistant Examiner—James D Ewart
(74) Attorney, Agent, or Firm—Scully, Scott, Murphy & Presser

(57) ABSTRACT

Radio mobile terminal 120 is provided with antenna 129, transmitting/receiving output unit 121, image information output unit 122 for outputting image information, line quality monitoring unit 123 for monitoring line quality between radio base station device 110 and radio mobile terminal 120 based on signals received at transmitting/receiving output unit 121, display method selector 124 for selecting an appropriate image display method on image display unit 140 according to the line quality, and display method designator 125 for outputting the selected display method to adapter for image display 130. Adapter for image display 130 is provided with image display processor 131 for receiving the image information and displaying an image on image display unit 140, and display operation unit 132 for receiving the instructions of display method designator 125 and operating image display processor 131 to modify to an appropriate display.

10 Claims, 8 Drawing Sheets

MOBILE TERMINAL EQUIPPED WITH ADAPTER FOR IMAGE DISPLAY AND METHOD FOR HANDLING CHANGES IN CONNECTION LINE QUALITY

BACKGROUND OF THE INVENTION

1. Field of the Invention

The present invention relates to a mobile terminal equipped with an adapter for image display, and particularly to a method of displaying images that accommodates changes in the quality of a connecting line.

2. Description of the Related Art

The increased liberalization of electronic communication has brought into daily use the prior-art mobile communication media which had been preferentially used in public enterprises and government and municipal offices, and moreover, the rapid popularization of car phones and portable telephones has brought about greater diversification of the content of radio mobile terminals.

As an example, transmission is no longer limited to speech but can now accommodate data and images, and image display devices that can connect to a radio mobile terminal have been put into practical use.

In contrast to a cable-connected device, however, a radio mobile terminal is in frequent motion, and the connecting line that connects to the radio base station device is therefore in a state of constant change. If an adapter for image display of an image terminal is connected to a radio mobile terminal, degradation of the quality of the radio line can in some cases result in interruptions of the image or in the unaltered display of an image of reduced quality.

Similarly, in cases in which communication between a radio mobile terminal and the adapter for image display itself is realized by a means having a potential for degradation in line quality, such as a wireless connection, this degradation of line quality can result in interruptions of the image or in the unaltered display of an image of reduced quality.

SUMMARY OF THE INVENTION

It is an object of the present invention to provide a mobile terminal provided with an adapter for image display, that, in the event of degradation of line quality, can display an image that is improved according to the type of degradation.

A mobile terminal provided with an adapter for image display according to this invention includes a radio mobile terminal connected to a radio base station device by a radio line, an adapter for image display connected to this radio mobile terminal, and an image display unit; wherein the radio mobile terminal monitors the quality of the line between the radio base station device and the radio mobile terminal, predicts degradation of the image produced by changes in the line quality, and communicates to the adapter for image display information relating to the manipulation of the image display content that is necessary for dealing with the predicted image degradation; and, by means of this information, the adapter for image display manipulates the image display content of the image display unit to modify it to an appropriate image display.

The selection of the appropriate image display method on the image display unit in accordance with the line quality may be performed at the radio mobile terminal, at the adapter for image display, or, by switching, at either the radio mobile terminal and the adapter for image display.

According to another embodiment, the adapter for image display monitors line quality between the mobile terminal and the adapter for image display, predicts the degradation of the image produced by changes in the line quality, and by means of information relating to the manipulation of image display content that is necessary for dealing with the predicted degradation of the image, manipulates the image display content of the image display unit to modify it to an appropriate image display.

According to yet another embodiment, a radio mobile terminal monitors the quality of the line between the radio base station device and the radio mobile terminal, predicts degradation of the image produced by changes in the line quality, communicates to the adapter for image display information relating to manipulation of the image display content that is necessary for dealing with the predicted image degradation; and, by means of this information, the adapter for image display manipulates the image display content of the image display unit to modify it to an appropriate image display, and further, monitors the quality of the line between the radio mobile terminal and the adapter for image display, predicts degradation of the image caused by changes in the line quality, and by means of information relating to manipulation of the image display content that is necessary for dealing with the predicted image degradation, manipulates the image display content of the image display unit to modify it to an appropriate image display.

The method for dealing with changes in line quality according to this invention is a method for dealing with changes in line quality in a mobile terminal that is provided with an adapter for image display and that includes a radio mobile terminal that is connected to a radio base station device by a radio line, an adapter for image display that is connected to this radio mobile terminal, and an image display unit; wherein the radio mobile terminal monitors the quality of the line between the radio base station device and the radio mobile terminal, predicts degradation of the image produced by changes in the line quality, and communicates to the adapter for image display information relating to manipulation of the image display content that is necessary for dealing with the predicted image degradation; and, by means of this information, the adapter for image display manipulates the image display content of the image display unit to modify it to an appropriate image display.

According to another embodiment, the adapter for image display monitors line quality between the mobile terminal and the adapter for image display, predicts changes in the image produced by changes in the line quality, and by means of information relating to manipulation of image display content that is necessary for dealing with the predicted degradation of the image, manipulates the image display content of the image display unit to modify it to an appropriate image display.

The present invention is a radio mobile terminal that is provided with an adapter for image display and that can monitor line quality between a radio base station device and a radio mobile terminal such as a portable telephone and insert this information in data and transmit to an adapter for image display; an adapter for image display that can manipulate image display content based on this information; and an adapter for image display that can monitor line conditions in cases in which degradation of line quality between the mobile terminal and adapter for image display is conceivable and manipulate the image content based on this information; whereby the present invention can obtain an appropriate image display that deals with changes in line conditions.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
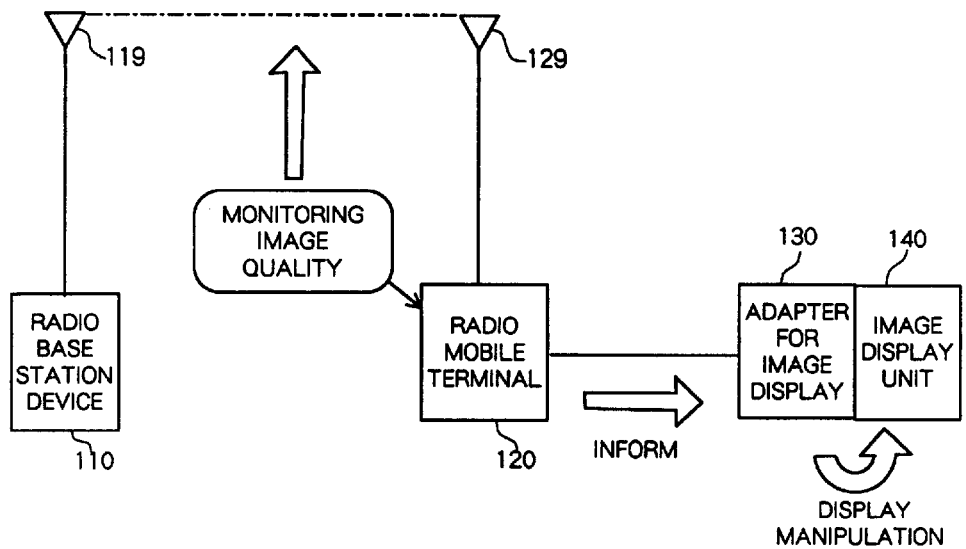
FIG. 1 is a schematic diagram of a mobile communication system that includes a mobile terminal provided with an adapter for image display according to the first and second embodiments of the present invention.

Referring now to the accompanying figures, the embodiments of the present invention are next explained. FIG. 1 is a schematic diagram of a mobile communication system that includes a mobile terminal that is provided with an adapter for image display according to the first and second embodiments of the present invention.

The mobile communication system includes radio base station device 110, radio mobile terminal 120 that is connected to radio base station device 110 by a radio line, adapter for image display 130 that is connected to radio mobile terminal 120, and image display unit 140.

Radio mobile terminal 120, which is, for example, a portable telephone, monitors the quality of the line between radio base station device 110 and radio mobile terminal 120, predicts degradation of an image that is caused by changes in the quality of the line, inserts information relating to manipulation of the image display content that is necessary for dealing with this degradation into data and notifies adapter for image display 130, whereupon adapter for image display 130 uses this information to manipulate the image display content of image display unit 140 and modifying it to an appropriate image display.

Figure 2:
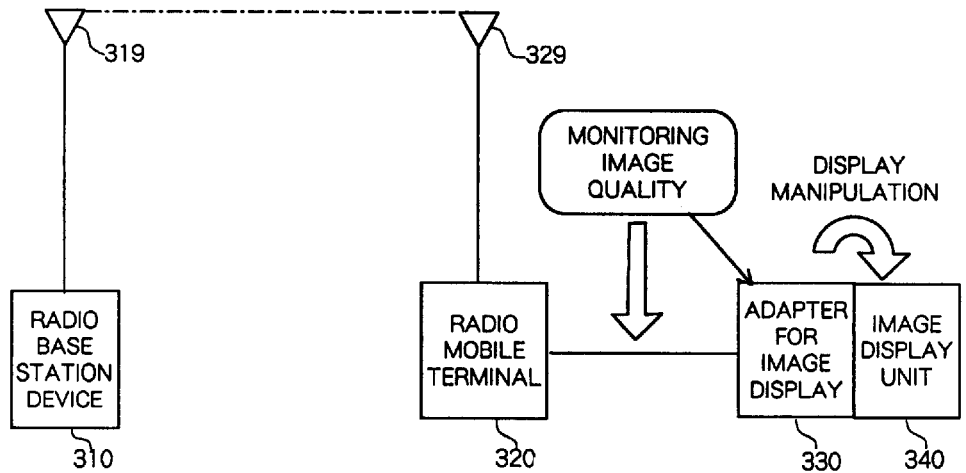
FIG. 2 is a schematic diagram of a mobile communication system that includes a mobile terminal that is provided with an adapter for image display according to the third embodiment of the present invention.

FIG. 2 is a schematic view of a mobile communication system that includes a mobile terminal that is provided with the adapter for image display according to the third embodiment of this invention. In contrast to the first and second embodiments, in which the line quality between radio base station device 310 and radio mobile terminal 320 is monitored, the line quality between radio mobile terminal 320 and adapter for image display 330 is monitored in the third embodiment. For example degradation in line quality between radio mobile terminal 320 and adapter for image display 330 is conceivable in the case of a wireless connection between radio mobile terminal 320 and adapter for image display 330. In such a case, line quality between radio mobile terminal 320 and adapter for image display 330 is monitored at adapter for image display 330, and to handle image degradation that can be predicted due to changes in the line quality, the image display content is manipulated to modify it to an appropriate display. This embodiment can also be applied to a case in which the base station device and mobile terminal are connected by wiring.

Figure 3:
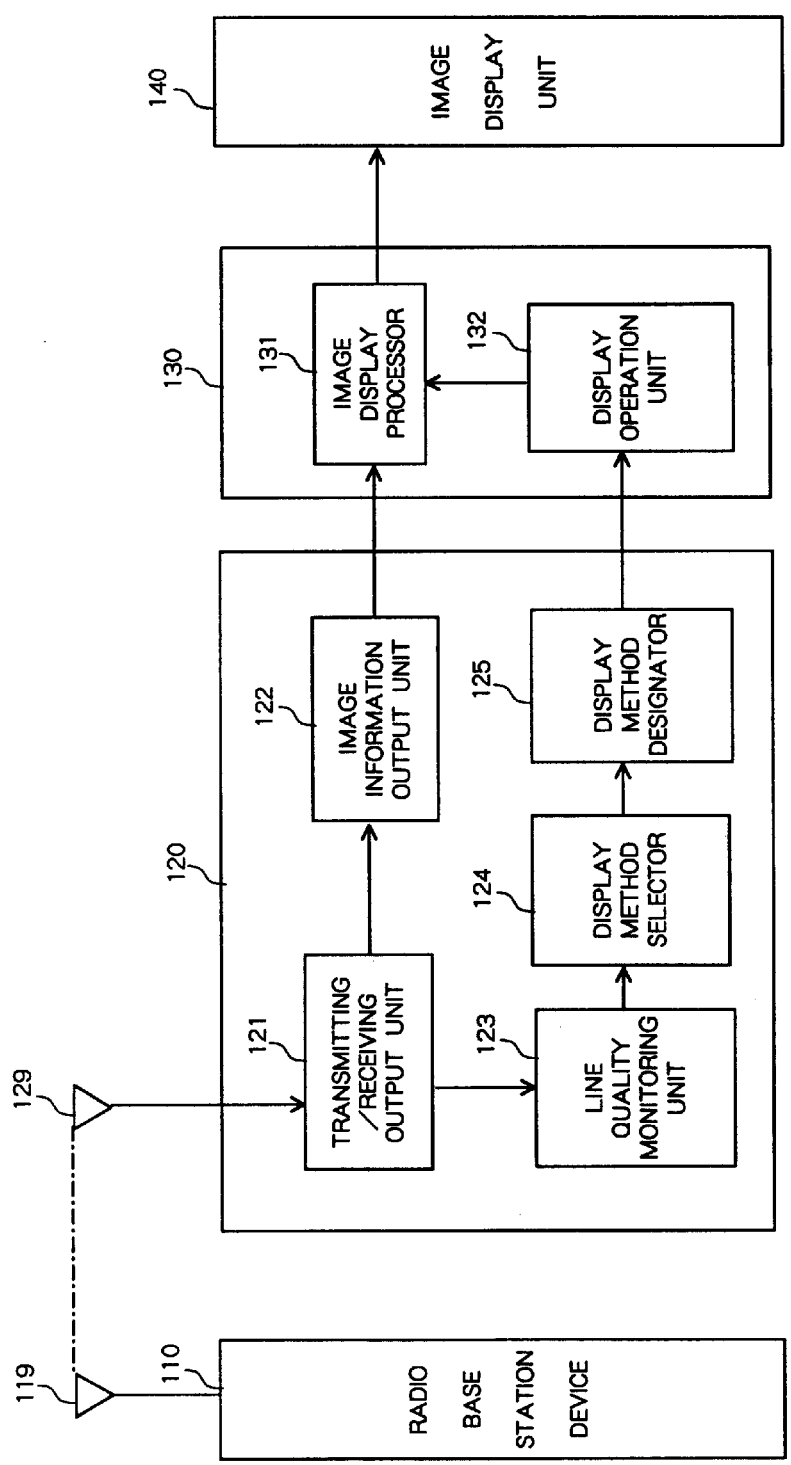
FIG. 3 is a block diagram showing the construction of a mobile terminal that is provided with an adapter for image display according to the first embodiment of the present invention.

Referring to the figures, explanation next regards the configuration of a mobile terminal that is provided with an adapter for image display according to the first embodiment of the present invention. FIG. 3 is a block diagram showing the construction of a mobile terminal that is provided with an adapter for image display according to the first embodiment of the present invention.

A mobile terminal provided with an adapter for image display is provided with radio mobile terminal 120, adapter for image display 130, and image display unit 140.

Radio mobile terminal 120 is provided with: antenna 129 for transmitting radiowaves to and receiving radiowaves from antenna 119 of radio base station device 110; transmitting/receiving output unit 121 for reproducing voice, data, or image information from radiowaves received at antenna 129 and conversely, for generating signals from received voice, data, or images and transmitting to radio base station device 110 by way of antenna 129; image information output unit 122 for outputting image information to adapter for image display 130; line quality monitoring unit 123 for monitoring the line quality between radio base station device 110 and radio mobile terminal 120 from signals received at transmitting/receiving output unit 121; display method selector 124 for selecting the appropriate image display method in image display unit 140 according to the line quality; and display method designator 125 for outputting the selected display method to adapter for image display 130.

Adapter for image display 130 is provided with: image display processor 131 for receiving image information from image information output unit 122 and displaying an image on image display unit 140; and display operation unit 132 for receiving instructions from display method designator 125 and manipulating image display processor 131 to modify to an appropriate display.

The configuration and functions of transmitting/receiving output unit 121 is similar to a mobile terminal that is provided with an adapter for image display of the prior art, and detailed explanation is therefore here omitted.

Line quality monitoring unit 123 may employ a known composition or line quality monitoring method, such as CRC coding mode that detects transmission errors by calculating a CRC code portion that is added to data that are restored to a frame format.

In this case, the modification to an appropriate display by adapter for image display 130 refers to such operations as, instead of displaying without alteration an image that suffers from reduced picture quality and interruptions due to degradation in line quality, turning OFF the display, rendering the disturbance in picture quality less obtrusive by dimming the screen luminance, displaying information reporting line conditions, and restoring normal operation when line conditions recover; the various display methods that can be selected according to the changes in line quality being stored in advance in display method selector 124.

Image display unit 140 may be structured as a single unit with adapter for image display 130 or may be independent and connected to adapter for image display 130.

Figure 4:
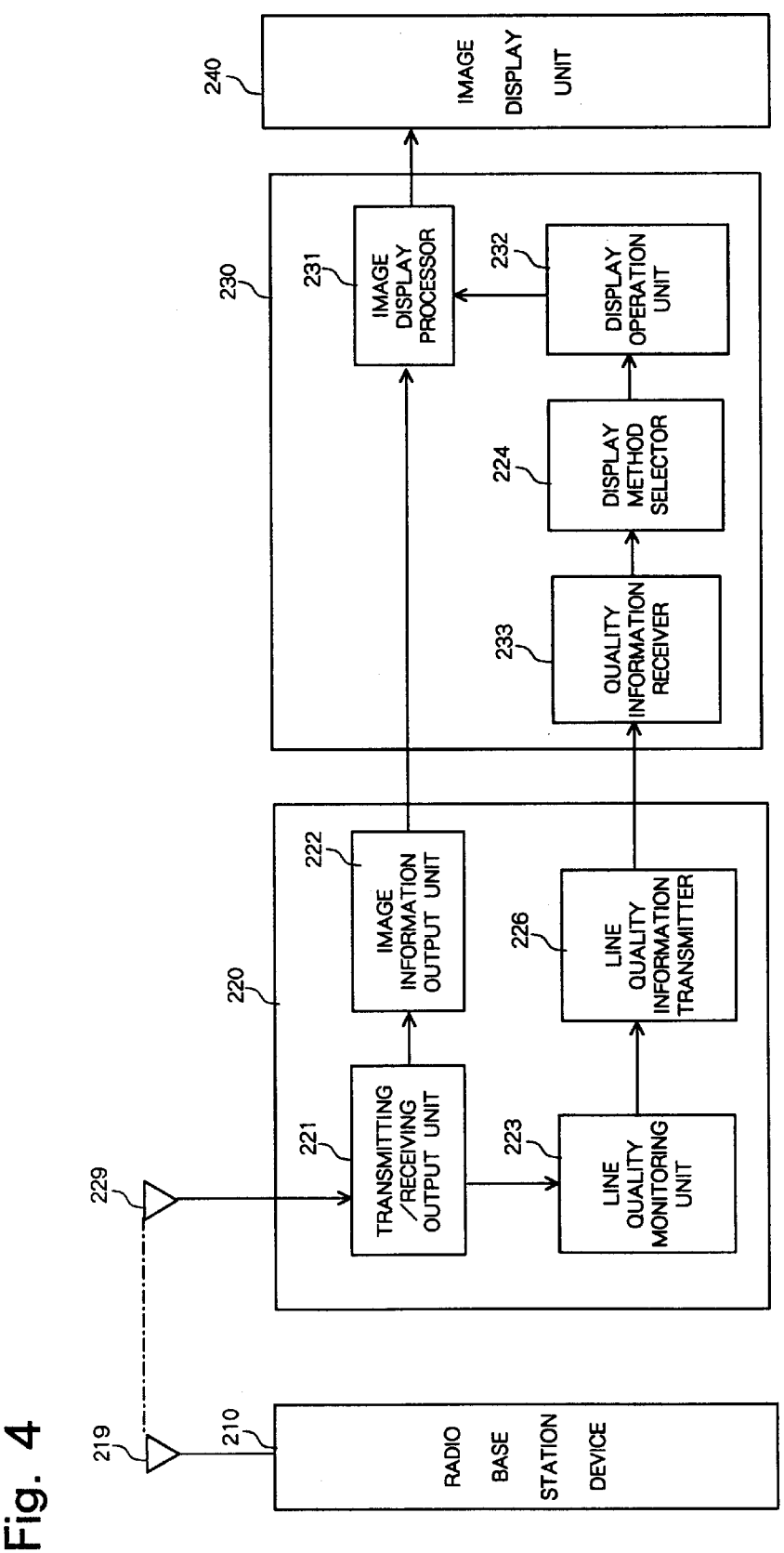
FIG. 4 is a block diagram showing the construction of a mobile terminal that is provided with an adapter for image display according to the second embodiment of the present invention.

The construction of a mobile terminal provided with an adapter for image display according to the second embodiment of the present invention is next described with reference to the accompanying figures. FIG. 4 is a block diagram showing the construction of a mobile terminal provided with an adapter for image display according to the second embodiment of the present invention.

A mobile terminal equipped with an adapter for image display is provided with radio mobile terminal 220, adapter for image display 230, and image display unit 240.

Radio mobile terminal 220 is provided with: antenna 229 for transmitting radiowaves to and receiving radiowaves from antenna 219 of radio base station device 210; transmitting/receiving output unit 221 for reproducing voice, data, or image information from radiowaves received at antenna 229 and conversely, for generating signals from received voice, data, or images and transmitting to radio base station device 210 by way of antenna 229; image information output unit 222 for outputting image information to adapter for image display 230; line quality monitoring unit 223 for monitoring the line quality between radio base station device 210 and radio mobile terminal 220 from signals received at transmitting/receiving output unit 221; and line quality information transmitter 226 for outputting line quality information detected at line quality monitoring unit 223 to adapter for image display 230.

Adapter for image display 230 is provided with: image display processor 231 for receiving image information from image information output unit 222 and displaying an image on image display unit 240; quality information receiver 233 for receiving the line quality information from line quality information transmitter 226; display method selector 234 for selecting an appropriate image display method for image display unit 240 according to line quality; display operation unit 232 for operating image display processor 231 to modify to an appropriate display according to the selected display method.

Although the selection of an appropriate image display method was carried out by radio mobile terminal 120 in the first embodiment, this selection is carried out at adapter for image display 230 in the second embodiment. The construction and functions are otherwise the same as the first embodiment, and redundant explanation is therefore omitted here.

Figure 5:
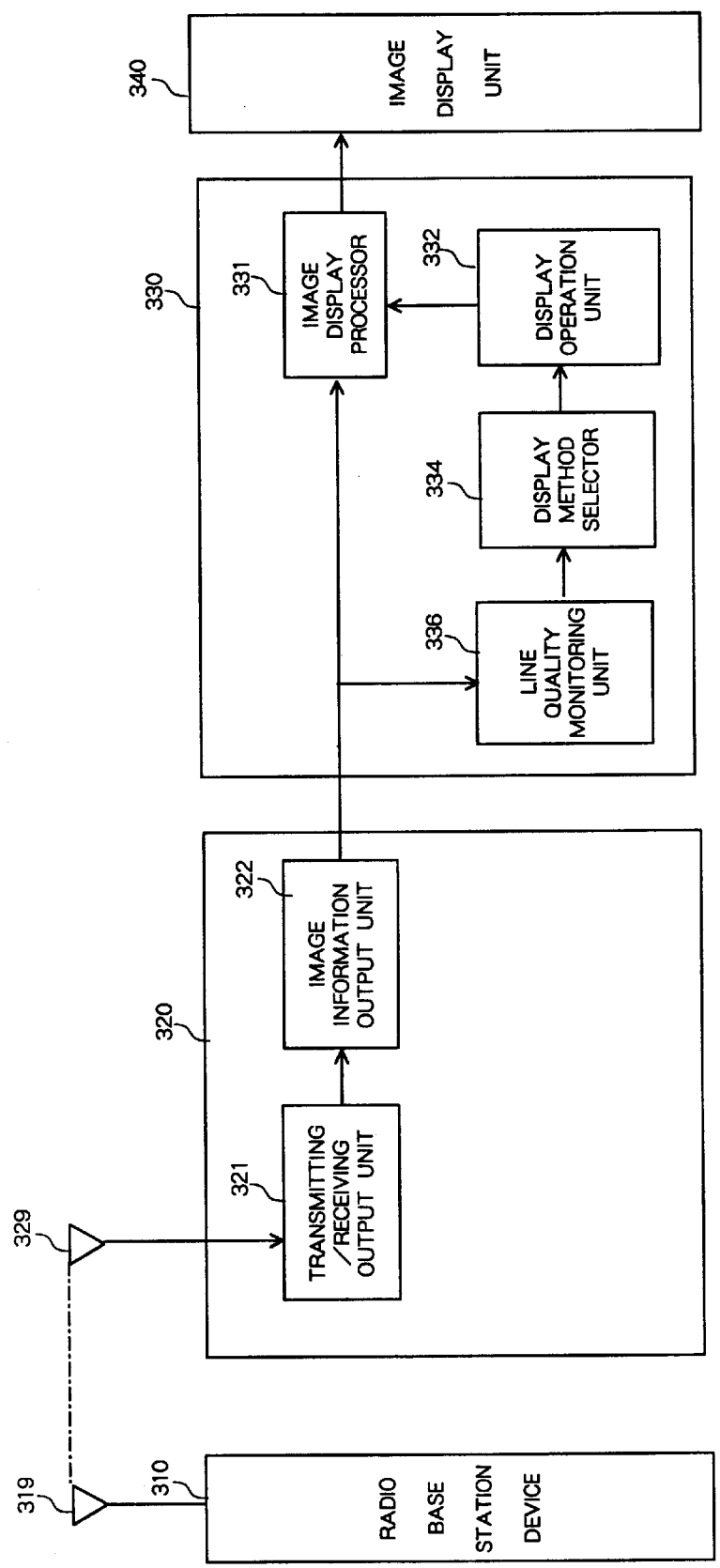
FIG. 5 is a block diagram showing the construction of a mobile terminal that is provided with an adapter for image display according to the third embodiment of the present invention.

Explanation next regards a mobile terminal provided with an adapter for image display according to the third embodiment of the present invention with reference to the accompanying figures. FIG. 5 is a block diagram showing the configuration of a mobile terminal provided with the adapter for image display of the third embodiment of the present invention.

The mobile terminal provided with the adapter for image display includes radio mobile terminal 320, adapter for image display 330, and image display unit 340.

Radio mobile terminal 320 is provided with: antenna 329 for transmitting radiowaves to and receiving radiowaves from antenna 319 of radio base station device 310; transmitting/receiving output unit 321 for reproducing voice, data, and image information from radiowaves received at antenna 329 and, conversely, generating signals from received voice, data, and images and transmitting to radio base station device 310 by way of antenna 329; and image information output unit 322 for outputting image information to adapter for image display 330.

Adapter for image display 330 is provided with: image display processor 331 for receiving image information from image information output unit 322 and displaying an image on image display unit 340; line quality monitoring unit 336 for connecting to the line that joins image information output unit 322 and image display processor 331 and then monitoring the quality of the line between image information output unit 322 and image display processor 331 based on the received signals; display method selector 334 for selecting the appropriate image display method in image display unit 340 according to the line quality information detected at line quality monitoring unit 336; and display operation unit 332 for operating image display processor 331 to modify to an appropriate display in accordance with the selected display method.

Although the line condition between radio base station device 310 and radio mobile terminal 320 was monitored in the first embodiment and the second embodiment, in the third embodiment, the line condition between radio mobile terminal 320 and adapter for image display 330 is monitored, and the display in image display unit 340 is manipulated according to the appropriate image display method depending on the line quality information. The construction and functions of this embodiment are otherwise the same as that of the first embodiment, and further explanation is therefore omitted here.

In these examples, the mobile terminal has been assumed to be a radio terminal. However, in a case in which the line as far as the mobile terminal is resistant to line degradation but line quality between the mobile terminal and the adapter for image display is prone to degradation, such as in an adapter for image display that is radio-connected to a cable-connected terminal, the line quality between adapter and terminal may be monitored and modification to an appropriate display carried out in the adapter for image display.

Figure 6:
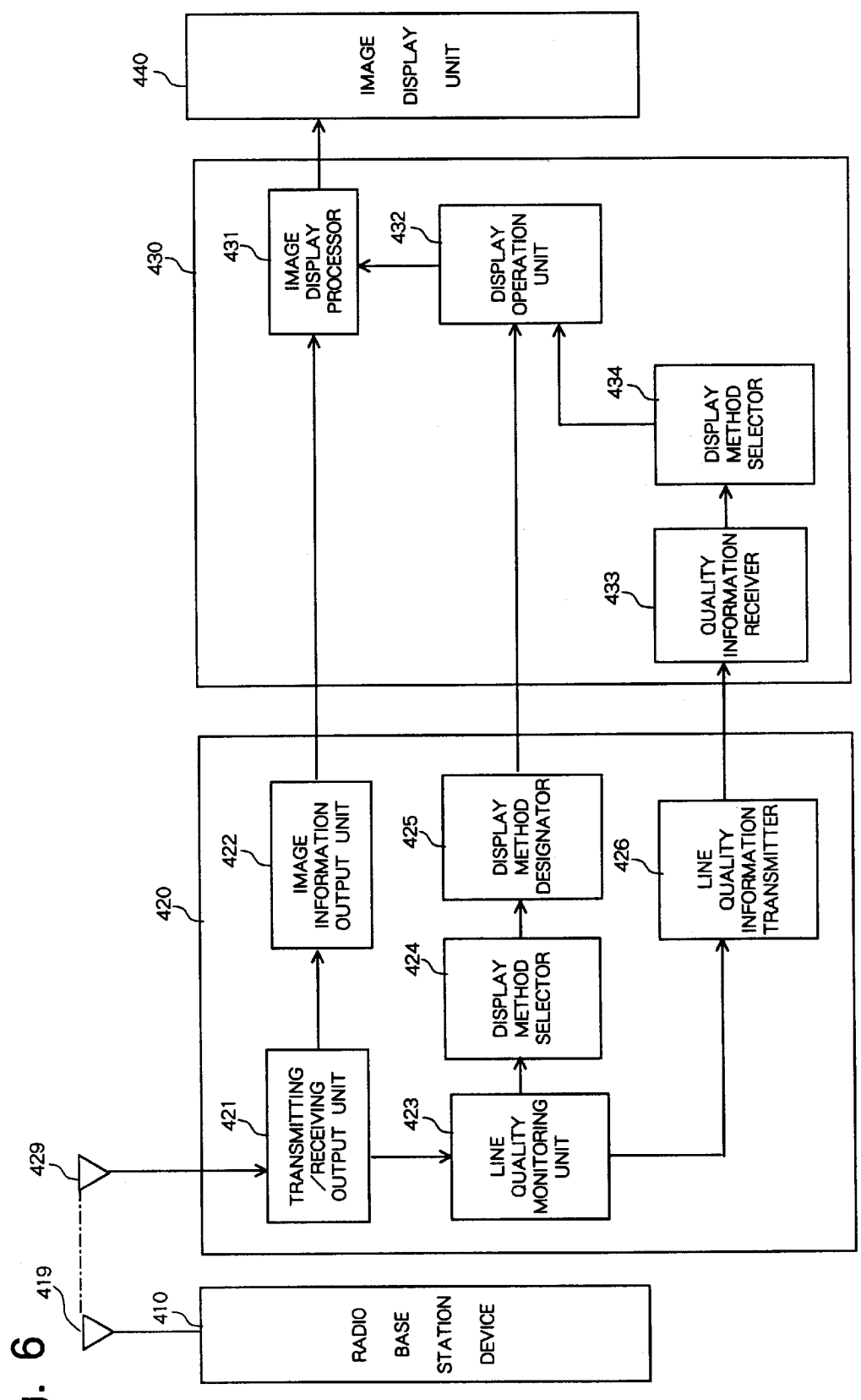
FIG. 6 is a block diagram showing the construction of a mobile terminal that is provided with an adapter for image display according to the fourth embodiment of the present invention.

The construction of a mobile terminal provided with an adapter for image display according to the fourth embodiment of the present invention is next explained with reference to the accompanying figures. FIG. 6 is a block diagram showing the construction of a mobile terminal provided with an adapter for image display according to the fourth embodiment of the present invention.

The mobile terminal provided with an adapter for image display includes radio mobile terminal 420, adapter for image display 430, and image display unit 440.

Radio mobile terminal 420 is provided with: antenna 429 for transmitting radiowaves to and receiving radiowaves from antenna 419 of radio base station device 410; transmitting/receiving output unit 421 for reproducing voice, data, and image information from radiowaves received at antenna 429 and conversely, for generating signals from received voice, data, and images and transmitting to radio base station device 410 by way of antenna 429; image information output unit 422 for outputting image information to adapter for image display 430; line quality monitoring unit 423 for monitoring the line quality between radio base station device 410 and radio mobile terminal 420 based on signals received at transmitting/receiving output unit 421; display method selector 424 for selecting the appropriate image display method in image display unit 440 in accordance with the line quality; display method designator 425 for outputting the selected display method to adapter for image display 430; and line quality information transmitter 426 for outputting line quality information detected at line quality monitoring unit 423 to adapter for image display 430.

Adapter for image display 430 is provided with: image display processor 431 for receiving image information from image information output unit 422 and displaying an image on image display unit 440; quality information receiver 433 for receiving line quality information from line quality information transmitter 426; display method selector 434 for selecting the appropriate image display method in image display unit 440 according to the line quality; and display operator 432 for receiving instructions from display method selector 434 or display method designator 425 and causing image display processor 431 to modify to the appropriate display in accordance with the selected display method.

The fourth embodiment is a form that combines the first embodiment and the second embodiment, and allows the selection of the display method to be performed at radio mobile terminal 420 or at adapter for image display 430 depending on the functions of adapter for image display 430 that is connected. This embodiment is effective in cases in which a variety of different adapters for image display 430 are connected to radio mobile terminal 420.

Figure 7:
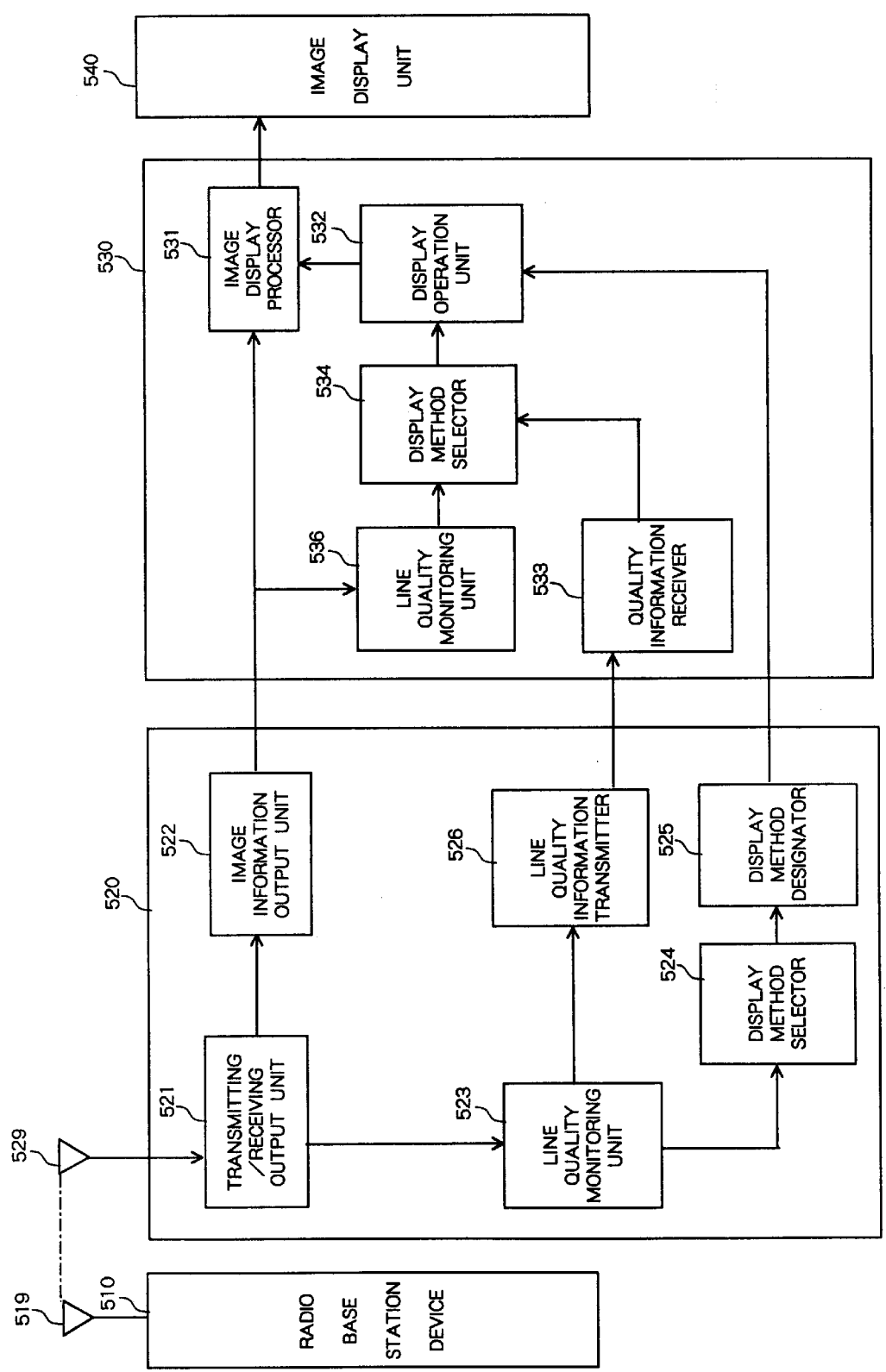
FIG. 7 is a block diagram showing the construction of a mobile terminal that is provided with an adapter for image display according to the fifth embodiment of the present invention.

Explanation is next presented with reference to the accompanying figures regarding the construction of a mobile terminal provided with an adapter for image display according to the fifth embodiment of the present invention. FIG. 7 is a block diagram showing the construction of a mobile terminal provided with an adapter for image display according to the fifth embodiment of the present invention.

The mobile terminal provided with an adapter for image display includes radio mobile terminal 520, adapter for image display 530, and image display unit 540.

Radio mobile terminal 520 is provided with: antenna 529 for transmitting radiowaves to and receiving radiowaves from antenna 519 of radio base station device 510; transmitting/receiving output unit 521 for reproducing voice, data, and image information from radiowaves received at antenna 529 and conversely, for generating signals from received voice, data, and images and transmitting to radio base station device 510 by way of antenna 529; image information output unit 522 for outputting image information to adapter for image display 530; line quality monitoring unit 523 for monitoring the line quality between radio base station device 510 and radio mobile terminal 520 based on signals received at transmitting/receiving output unit 521; display method selector 524 for selecting the appropriate image display method in image display unit 540 according to the line quality; display method designator 525 for outputting the selected display method to adapter for image display 530; and line quality information transmitter 526 for outputting line quality information detected at line quality monitoring unit 523 to adapter for image display 530.

Adapter for image display 530 is provided with: image display processor 531 for receiving image information from image information output unit 522 and displaying an image on image display unit 540; quality information receiver 533 for receiving line quality information from line quality information transmitter 526; line quality monitoring unit 536 for connecting to the line joining image information output unit 522 and image display processor 531 and monitoring the line quality between image information output unit 522 and image display processor 531 based on the received signals; display method selector 534 for selecting the appropriate image display method in image display unit 540 in accordance with the line quality information received at quality information receiver 533 or the line quality information detected at line quality monitoring unit 536; and display operator 532 for causing image display processor 531 to change to the appropriate display in accordance with the display method that was selected at display method selector 524 or at display method selector 534.

The fifth embodiment is a combination of the first embodiment, second embodiment, and third embodiment. This embodiment enables both monitoring of line quality between radio base station device 510 and radio mobile terminal 520 and monitoring of line quality between radio mobile terminal 520 and adapter for image display 530, and further, in monitoring the line quality between radio base station device 510 and radio mobile terminal 520, allows the selection of the display method to be performed at either radio mobile terminal 520 or at adapter for image display 530, depending on the functions of adapter for image display 530 that is connected.

As described in the foregoing explanation, in the fifth embodiment, the line quality between the radio base station device and the radio mobile terminal is monitored, either line quality information or information directing display modification according to the line quality is sent to the adapter for image display, and based on this information, the adapter for image display operates to modify to the appropriate display.

In cases in which the adapter for image display is connected by a means that is prone to line quality degradation, such as by a wireless connection, the line quality between the radio mobile terminal and the adapter for image display is monitored, and depending on the line conditions, the adapter for image display operates to modify to an appropriate display.

The "modification to appropriate display by the adapter for image display" signifies that, instead of displaying without alteration an image that suffers from interruptions or reduced picture quality due to degradation in line quality as described hereinabove, operations are carried out such as turning OFF the display, reducing screen luminance to make disruption of image quality less apparent, displaying information that reports line conditions, and then restoring normal operation upon recovery of line conditions.

The adapter for image display has the function of selecting the appropriate operation based on line condition information either when monitoring line quality or when line condition information data are sent in. In addition, this construction allows the switching among the operations that are to be carried out to be set at either the adapter for image display or radio mobile terminal.

Although the fifth embodiment allows the selection of the display method to be performed at either the radio mobile terminal or at the adapter for image display, selection may be carried out at only one site.

Explanation is next presented with reference to the accompanying figures regarding the operation of a mobile terminal that is provided with an adapter for image display with the fifth embodiment as an example. The operation of each of the first to fourth embodiments is included in that of the fifth embodiment, and individual explanation is therefore omitted.

Figure 8:
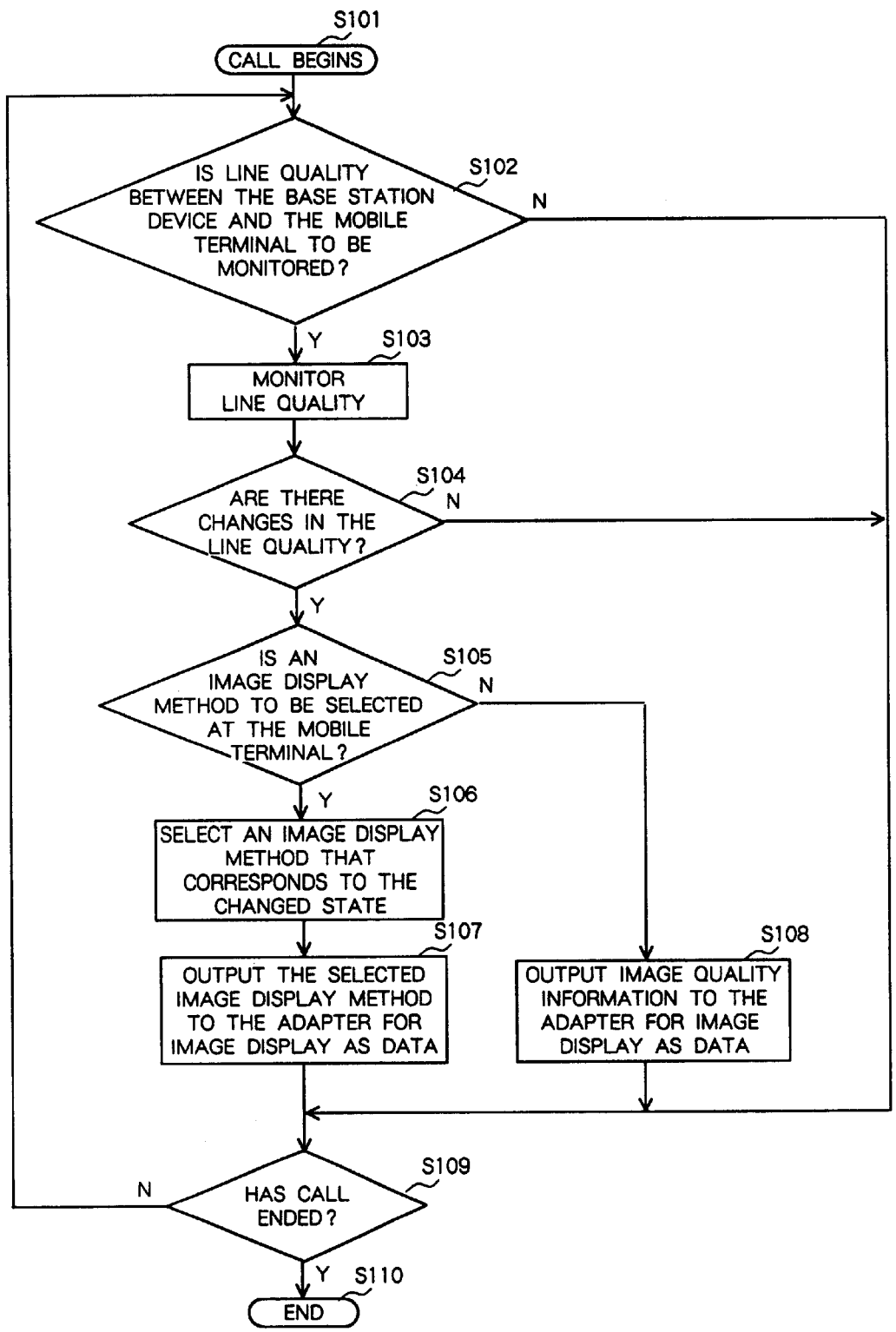
FIG. 8 is a flow chart for explaining the operation of a radio mobile terminal according to the fifth embodiment of the present invention.
Figure 9:
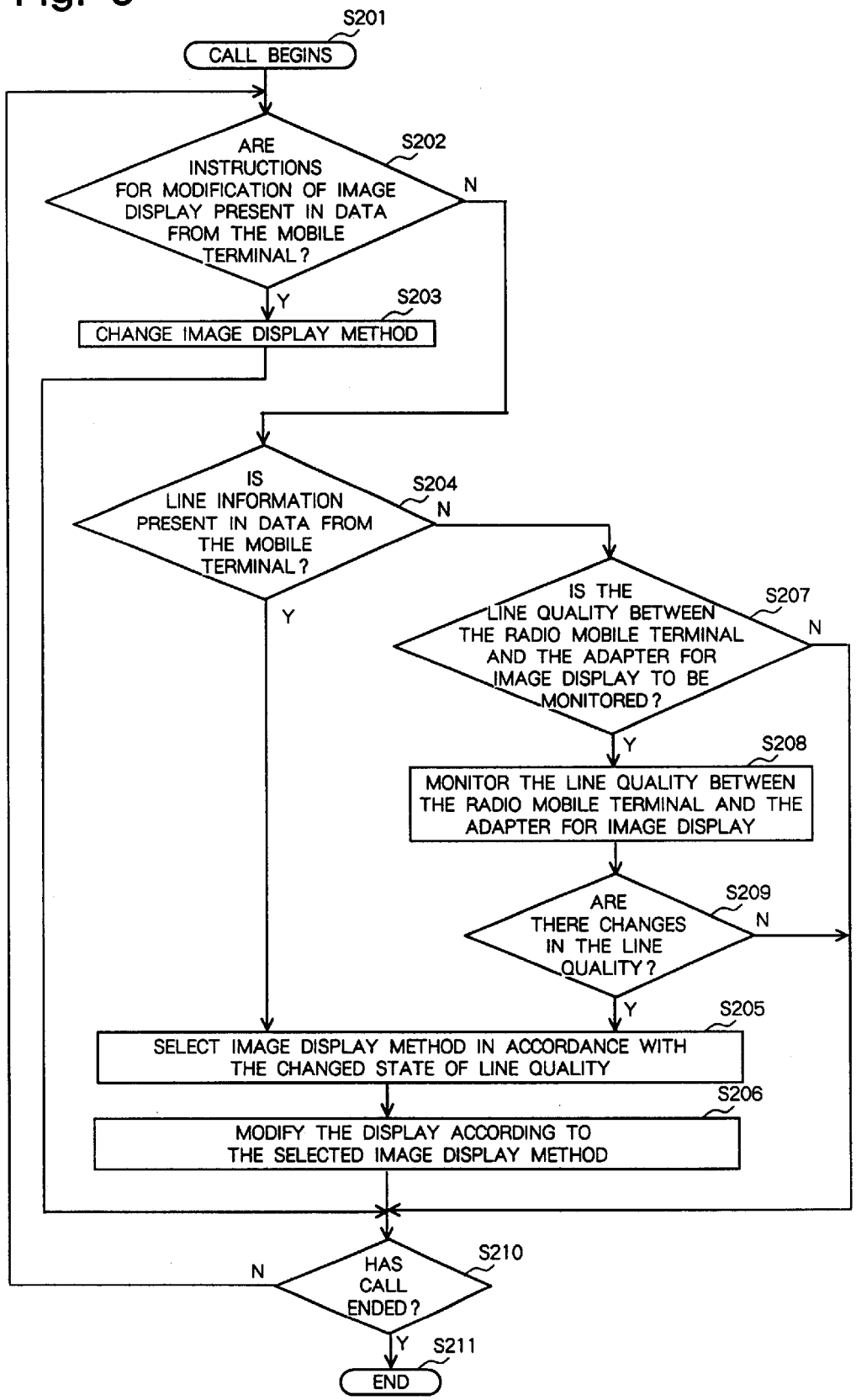
FIG. 9 is a flow chart for explaining the operation of the adapter for image display according to the fifth embodiment of the present invention.

FIG. 8 is a flow chart for explaining the operation of the radio mobile terminal according to the fifth embodiment of the present invention, and FIG. 9 is a flow chart for explaining the operation of the adapter for image display according to the fifth embodiment of the present invention.

In the radio mobile terminal, when a call begins (S101), it is first verified whether line quality between the radio base station device and radio mobile terminal is to be monitored (S102), and if line quality monitoring between the radio base station device and the radio mobile terminal is selected (S102Y), line quality monitoring between the radio base station device and the radio mobile terminal is performed (S103). If a change occurs in the line quality (S104Y), it is then verified whether selection of the image display method is to be carried out at the radio mobile terminal (S105), and if selection of the image display method is to be carried out at the radio mobile terminal (S105Y), an image display method is selected that corresponds to the changed state of the line quality (S106) and the selected image display method is outputted to the adapter for image display as data (S107). If the call has not ended (S109N), the process returns to Step S102 and the operation is repeated. If the call has ended (S109Y), the process is terminated (S110).

If the selection of the image display method is not to be performed in the radio mobile terminal (S105N), image quality information is outputted to the adapter for image display (S108). If the call has not ended (S109N), the process returns to Step S102 and the operation is repeated. If the call has ended (S109Y), the process is terminated (S110).

If line quality monitoring between the radio base station device and the mobile terminal is not selected (S102N), the process proceeds to Step S109, and if the call has not ended (S109N), the process returns to Step S102 and the operation is repeated. If the call has ended (S109Y), the process is terminated (S110).

If there is no change in the line quality (S104Y), the process proceeds to Step S109, and if the call has not ended (S109N), the process returns to Step S102 and the operation is repeated. If the call has ended (S109Y), the process is terminated (S110).

The radio mobile terminal monitors the line quality between the radio base station device and the radio mobile terminal, and outputs to the adapter for image display data designating the appropriate display according to the line conditions. In a case in which the line conditions deteriorate, depending on the line conditions, data designating such operations as turning off the display, reducing the luminance, or displaying line condition information, or alternatively, data reporting the line condition, are sent to the adapter for image display. When the line conditions recover, data that can restore the adapter for image display to normal operation are sent.

In the adapter for image display, when a call begins (S201), it is first verified whether instructions to modify the image display are present in data from the radio mobile-terminal (S202). If there are image display modification instructions (S202Y), the image display method is modified in accordance with the instructions (S203), and if the call has not ended (S210N), the process returns to Step S202 and the operation is repeated. If the call has ended (S210Y), the process is terminated (S211).

If there are no instructions to modify image display in the data from the radio mobile terminal (S202N), it is next verified whether line information is included in the data from the radio mobile terminal (S204). If there is line information (S204Y), an image display method is selected that corresponds to the changed state of the line quality (S205), and the display is modified according to the selected image display method (S206). If the call has not ended (S210N), the process returns to Step S202 and the operation is repeated. If the call has ended (S210Y), the process is terminated (S211).

If there is no line information in the data from the radio mobile terminal (S204N), it is next verified whether line quality is to be monitored between the radio mobile terminal and the adapter for image display (S207). If line quality is to be monitored between the radio mobile terminal and the adapter for image display (S207Y), the line quality is monitored between the radio mobile terminal and the adapter for image display (S208). If a change should occur in the line quality (S209Y), an image display method is selected according to the state of change of the line quality (S205), and the display is modified according to the selected image display method (S206). If the call has not ended (S210N), the process returns to Step S202 and the operation is repeated, and if the call has ended (S210Y), the process is terminated (S211). If line quality between the radio mobile terminal and the adapter for image display is not to be monitored (S207N) or if there is no change in line quality (S209N), the process returns to Step S210. If the call has not ended (S210N), the process returns to Step S202 and the operation is repeated, and if the call has ended (S210Y), the process is terminated (S211).

If instructions to modify the display are contained in data received from the radio mobile terminal, display is outputted in accordance with the instructions. If the line conditions are to be reported, an appropriate display according to the line conditions is outputted. The unaltered display of an image of reduced quality (such as interruptions of the picture or disturbances in picture quality) can be avoided by, for example, turning OFF the display, reducing luminance, or displaying the conditions.

If the radio mobile terminal and the adapter for image display are connected such that there exists a possibility of degradation in line quality, such as a wireless connection, the adapter for image display monitors the line quality, judges the line conditions, and operates to produce an appropriate display. Alternatively, if a possibility for degradation in line quality exists between the terminal and the adapter for image display, such as in a case in which an adapter for image display is radio-connected to a cable-connected terminal, the adapter for image display monitors the line quality and operation is carried out at the adapter for image display to modify to an appropriate display.

The judgment of the line quality between the adapter for image display and the radio mobile terminal or the above-described cable-connected terminal need not be carried out at the adapter for image display as in the third and fifth embodiments. Instead, the radio mobile terminal or the cable-connected terminal can monitor and judge conditions, and this information can be inserted into data to the adapter for image display.

As described hereinabove, the present invention monitors line quality between a base station device and a mobile terminal or between a mobile terminal and an adapter for image display, and in the event of degradation of line quality, causes the adapter for image display to perform appropriate display (such as turning off the display, reducing luminance, or displaying line quality information). As a result, the present invention has the effect of avoiding the unaltered display of an image that suffers from reduced quality (such as interruptions of the image or disturbances of picture quality) that may occur as a result of degradation in line quality.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A mobile terminal provided with an adapter for image display and that includes a radio mobile terminal that is connected to a radio base station device by a radio line, an adapter for image display that is connected to said radio mobile terminal, and an image display unit, wherein:

said radio mobile terminal monitors the quality of the line between said radio base station device and the radio mobile terminal, and communicates to said adapter for image display information relating to manipulation of the image display content that is necessary for dealing with image degradation that can be predicted to occur due to changes in the line quality; and said adapter for image display, by means of this information, manipulates the image display content of said image display unit to modify it to an appropriate image display.

2. A mobile terminal provided with an adapter for image display according to claim 1 wherein:

said radio mobile terminal comprises: an antenna for transmitting radiowaves to and receiving radiowaves from an antenna of said radio base station device; a transmitting/receiving output unit for reproducing voice, data, and image information from radiowaves received at said antenna, and conversely, for generating signals from received voice, data, and images and transmitting to said radio base station device by way of said antenna; an image information output unit for outputting image information to said adapter for image display; a line quality monitoring unit for monitoring line quality between said radio base station device and said radio mobile terminal based on signals received at said transmitting/receiving output unit; a display method selector for selecting an appropriate image display method on said image display unit according to line quality; and a display method designator for outputting the selected display method to said adapter for image display; and said adapter for image display comprises: an image display processor for receiving image information from said image information output unit and displaying an image on said image display unit; and a display operation unit for receiving instructions from said display method designator and operating said image display processor to modify to an appropriate display.

3. A mobile terminal provided with an adapter for image display according to claim 1 wherein:

said radio mobile terminal comprises: an antenna for transmitting radiowaves to and receiving radiowaves from an antenna of said radio base station device; a transmitting/receiving output unit for reproducing voice, data, and image information from radiowaves received at said antenna, and conversely, for generating signals from received voice, data, and images and transmitting to said radio base station device by way of said antenna; an image information output unit for outputting image information to said adapter for image display; a line quality monitoring unit for monitoring line quality between said radio base station device and said radio mobile terminal based on signals received at said transmitting/receiving output unit; and a line quality information transmitter for outputting line quality information that was detected at said line quality monitoring device to said adapter for image display; and said adapter for image display comprises: an image display processor for receiving image information from said image information output unit and displaying an image on said image display unit; a quality information receiver for receiving line quality information from said line quality information transmitter; a display method selector for selecting an appropriate image display method on said image display unit according to line quality; and a display operation unit for operating said image display processor to modify to an appropriate display in accordance with the selected display method.

4. A mobile terminal provided with an adapter for image display according to claim 1 wherein:

said radio mobile terminal comprises: an antenna for transmitting radiowaves to and receiving radiowaves from an antenna of said radio base station device; a transmitting/receiving output unit for reproducing voice, data, and image information from radiowaves received at said antenna, and conversely, for generating signals from received voice, data, and images and transmitting to said radio base station device by way of said antenna; an image information output unit for outputting image information to said adapter for image display; a line quality monitoring unit for monitoring line quality between said radio base station device and said radio mobile terminal based on signals received at said transmitting/receiving output unit; a display method selector for selecting an appropriate image display method on said image display unit according to line quality; a display method designator for outputting the selected display method to said adapter for image display; and a line quality information transmitter for outputting line quality information detected at said line quality monitoring unit to said adapter for image display; and said adapter for image display comprises: an image display processor for receiving image information from said image information output unit and displaying an image on said image display unit; a quality information receiver for receiving line quality information from said line quality information transmitter; a display method selector for selecting an appropriate image display method on said image display unit according to line quality; and a display operation unit for receiving instructions from either of said display method selector and said display method designator and operating said image display processor to modify to an appropriate display.

5. A mobile terminal provided with an adapter for image display and that includes a mobile terminal that is connected to a base station device by a line, an adapter for image display that is connected to said mobile terminal, and an image display unit, wherein:

said adapter for image display monitors line quality between said mobile terminal and the adapter for image display, and, in accordance with information relating to manipulation of the image display content that is necessary for dealing with image degradation that can be predicted to occur due to changes in the line quality, manipulates the image display content of said image display unit to modify it to an appropriate image display.

6. A mobile terminal provided with an adapter for image display according to claim 5, wherein:

said adapter for image display comprises: an image display processor for receiving image information from said mobile terminal and displaying an image on said image display unit; a line quality monitoring unit that connects to the line that joins said mobile terminal and said image display processor and that monitors line quality between said mobile terminal and said image display processor based on received signals; a display method selector for selecting an appropriate image display method on said image display unit in accordance with line quality information detected at said line quality monitoring unit; and a display operation unit for operating said image display processor to modify to an appropriate display in accordance with the selected display method.

7. A mobile terminal provided with an adapter for image display and that includes a radio mobile terminal that is connected with a radio base station device by a radio line, an adapter for image display that is connected to the radio mobile terminal, and an image display unit; wherein:

said radio mobile terminal monitors the quality of the line between said radio base station device and the radio mobile terminal, and communicates to said adapter for image display information relating to manipulation of the image display content that is necessary for dealing with image degradation that can be predicted to occur due to changes in the line quality; and said adapter for image display, by means of this information, both manipulates the image display content of said image display unit to modify it to an appropriate image display, and monitors line quality between said radio mobile terminal and the adapter for image display, and, by means of information relating to operation of the image display content that is necessary for dealing with image degradation that can be predicted to occur due to changes in line quality, manipulates the image display content of said image display unit and modifies it to an appropriate image display.

8. A mobile terminal provided with an adapter for image display according to claim 7, wherein:

said radio mobile terminal comprises: an antenna for transmitting radiowaves to and receiving radiowaves from an antenna of said radio base station device; a transmitting/receiving output unit for reproducing voice, data, and image information from radiowaves received at said antenna, and conversely, for generating signals from received voice, data, and images and transmitting to said radio base station device by way of said antenna; an image information output unit for outputting image information to said adapter for image display; a line quality monitoring unit for monitoring line quality between said radio base station device and said radio mobile terminal based on signals received at said transmitting/receiving output unit; a display method selector for selecting an appropriate image display method on said image display unit according to line quality; a display method designator for outputting the selected display method to said adapter for image display; and a line quality information transmitter for outputting line quality information that was detected at said line quality monitoring unit to said adapter for image display; and said adapter for image display comprises: an image display processor for receiving image information from said image information output unit and displaying an image on said image display unit; a quality information receiver for receiving line quality information from said line quality information transmitter; a line quality monitoring unit that connects to the line that joins said image information output unit and said image display processor for monitoring the line quality between said image information output unit and said image display processor based on received signals; a display method selector for selecting an appropriate image display method on said image display unit according to either of line quality information received at said quality information receiver or line quality information that is detected at said line quality monitoring unit and a display operation unit for operating said image display processor to modify to an appropriate display according to either of the selected display method or the instructions of said display method designator.

9. A method of handling change in line quality in a mobile terminal that is provided with an adapter for image display and that includes a radio mobile terminal that is connected to a radio base station device by a radio line; an adapter for image display that is connected to said radio mobile terminal, and an image display unit; wherein:

said radio mobile terminal monitors line quality between said radio base station device and the radio mobile terminal, and communicates to said adapter for image display information relating to manipulation of the image display content that is necessary for dealing with image degradation that can be predicted to occur due to changes in the line quality; and said adapter for image display, by means of this information, manipulates the image display content of said image display unit to modify it to an appropriate image display.

10. A method of handling change in line quality in a mobile terminal that is provided with an adapter for image display and that includes a mobile terminal that is connected to a base station device by a line; an adapter for image display that is connected to the mobile terminal, and an image display unit; wherein:

said adapter for image display monitors line quality between said mobile terminal and the adapter for image display, and by means of information relating to manipulation of the image display content that is necessary for dealing with image degradation that can be predicted to occur due to changes in the line quality, manipulates the image display content of said image display unit to modify it to an appropriate image display.

* * * * *